United States Patent [19]
Sircar et al.

[11] 3,920,694
[45] Nov. 18, 1975

[54] 4-HYDROXY-9-METHYL-4-VINYL-1,2,3,4-TETRAHYDROCARBAZOLE

[75] Inventors: Jagadish C. Sircar, Dover; Harold Zinnes, Rockaway, both of N.J.

[73] Assignee: Warner-Lambert Company, Morris Plains, N.J.

[22] Filed: Feb. 18, 1975

[21] Appl. No.: 550,334

Related U.S. Application Data

[62] Division of Ser. No. 475,559, June 3, 1974.

[52] U.S. Cl.............. 260/315; 260/240 R; 424/274
[51] Int. Cl.².................................. C07D 209/88
[58] Field of Search................................ 260/315

[56] References Cited
FOREIGN PATENTS OR APPLICATIONS
1,225,664  3/1971  United Kingdom................ 260/315

OTHER PUBLICATIONS
J. Chem. Soc. C. 1970: 325–326, Coombes et al.
J. Org. Chem. 30: 1550–1553 (1965), Dolby et al.

*Primary Examiner*—Sherman D. Winters
*Attorney, Agent, or Firm*—Albert H. Graddis; Frank S. Chow

[57] ABSTRACT

Indolosteroids having the following formulas are disclosed

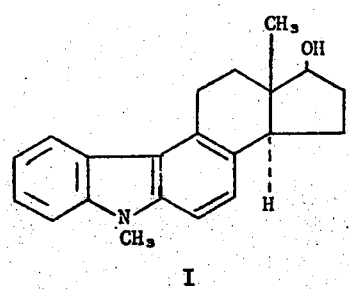

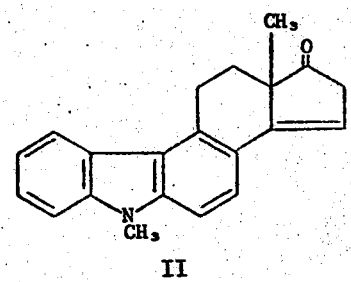

These compounds are useful as an adjunct in skin grafts.

1 Claim, No Drawings

4-HYDROXY-9-METHYL-4-VINYL-1,2,3,4-TETRAHYDROCARBAZOLE
This is a division, of application Ser. No. 475,559 filed June 3, 1974.
The present invention relates to indolosteroids. More specifically the present invention relates to 6,12a-dimethylindeno-[4,5c]-carbazoles of the formulas:
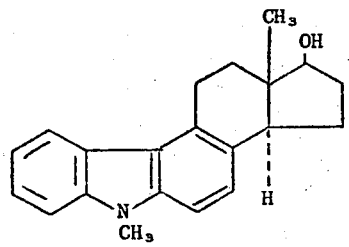
I
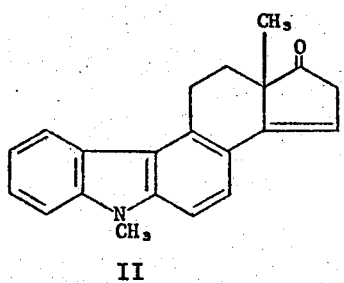
II
Broadly speaking, the above compounds are prepared according to the following reaction scheme:
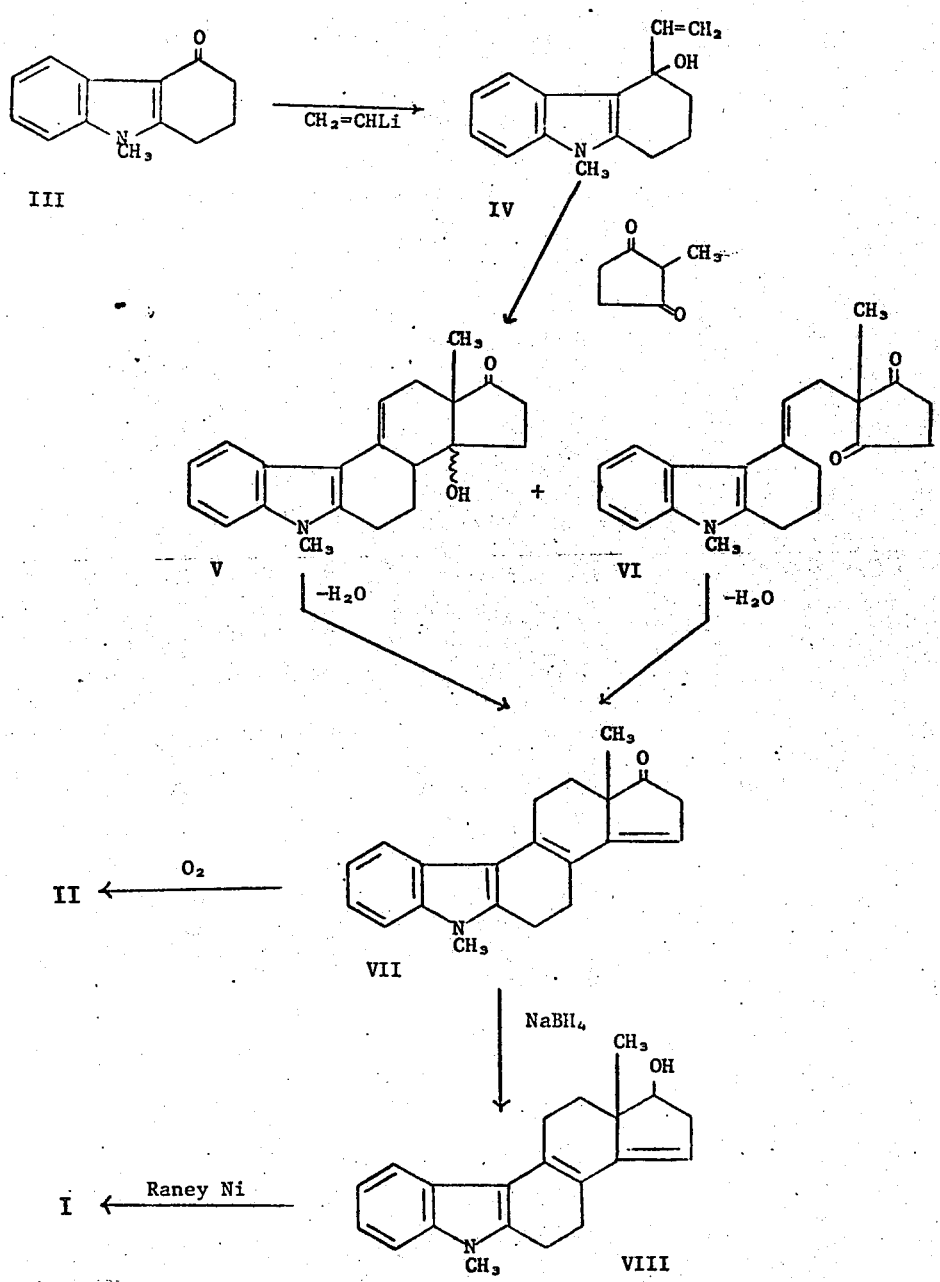

Referring to the above scheme, 9-methyl-4-keto-1,2,3,4-tetrahydrocarbazole III is reacted with vinyllithium in a solvent such as tetrahydrofuran to give IV. This is reacted with 2-methylcyclopentanedione using a strong basic catalyst such as benzyltrimethylammonium hydroxide available commercially as Triton B (J. T. Baker Co., Eastman Kodak, etc.) to give a mixture of V and VI, the latter being the predominant product. Both V and VI undergo facile dehydration in the presence of acids such as hydrochloric acid or p-toluene-sulfonic acid to form VII. Reduction with a complex metal hydride such as sodium borohydride of VII gives the alcohol VII which is converted to compound I by stirring with Raney Nickel catalyst in a solvent such as tetrahydrofuran. Compound II is obtained by passing a stream of oxygen through a solution of VII in a solvent such as a mixture of alcohol and chloroform.

The starting compound III is prepared as described by H. J. Teuber and D. Cornelius, Ann. Chem. 671; 127 (1964).

The compounds of the invention are useful as adjunct agents in skin graft therapy. For example, they exhibit the property to prolong the survival of allografts in laboratory animals such as mice. Thus at an i.p. dose of 5 mg/kg to 100 mg/kg they prolong the life span of allografts in mice.

They are indicated as an adjunct in skin graft therapy to suppress host rejection of the graft within the above dose range. This dose can be varied depending upon the condition of the host being treated.

These compounds are administered subcutaneously or intramuscularly in dosage forms suitable for such administration. For example, they are combined with a vehicle such as a peanut oil, sesame oil and compounded with dosage forms by known pharmaceutical technology.

In order to illustrate further the practice of the present invention, the following examples are included.

EXAMPLE 1

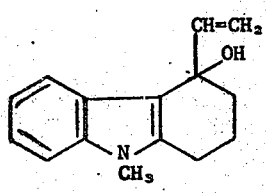

4-Hydroxy-9-methyl-4-vinyl-1,2,3,4-tetrahydrocarbazole.

A suspension of 67 g (0.33 mol) of 4-keto-9-methyl-1,2,3,4-tetrahydrocarbazole in 1700 ml of tetrahydrofuran was cooled to −10° and 1.0 mol (as a 2.9 molar solution in tetrahydrofuran) of vinyllithium was added over a 75 min period. The reaction mixture was allowed to slowly warm up to room temperature, stirred for 2 hr, decomposed with ice-water, and extracted with dichloromethane. The dichloromethane solution was concentrated to a small volume (not to dryness) and an oil separated from solution. The upper solvent layer was decanted from the oil and the latter was triturated with ether to give 60 g of product, mp 91°–95° dec, which was of sufficient purity for use as an intermediate for further reactions. A portion was dissolved in tetrahydrofuran and petroleum ether was added till crystals separated. The first crop (mp 90°–93°) was filtered off and the mother liquor was concentrated to give a second crop, mp 95°–96° dec. This second crop was recrystallized in the same manner to give an analytical sample, mp 95°–97° dec.

Anal. Calcd for $C_{15}H_{17}NO$: C, 79.26; H 7.54; N, 6.16. Found: C, 79.30; H, 7.72; N, 6.18. $\nu^{Nujol}$ 3300, 1610, 1558 cm$^{-1}$.

EXAMPLE 2

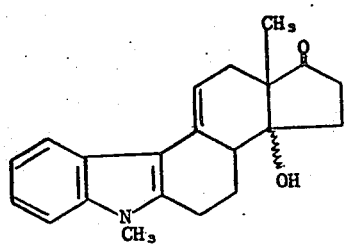

3,3a,4,5,6,11,12,12a-Octahydro-6,12a-dimethyl-3-hydroxyindene [4,5c]-carbazol-1(2H)-one.

To a solution of 56.8 g (0.25 mol) of 4-hydroxy-9-methyl-4-vinyl-1,2,3,4-tetrahydrocarbazole in a mixture of 500 ml of xylene and 150 ml of tert-butanol was added 28.1 g (0.25 mol) of 2-methylcyclopentan-1,3-dione. The mixture was stirred at room temperature for 15 minutes, 10.8 ml of 40% methanolic Triton B was added, and it was refluxed under a nitrogen atomsphere for 3 hr, using a Dean-Stark separator to remove the water which formed during the reaction. The reaction mixture was filtered away from insoluble unreacted 2-methyl-cyclopentan-1,3-dione and the filtrate was washed successively with 5% potassium hydroxide solution, aqueous sodium chloride solution, and water. The dried ($Na_2SO_4$) organic layer was concentrated to a volume of about 200 ml and diluted with 500 ml of ether. The resulting precipitate (52 g) was collected and stirred at room temperature, under nitrogen, for 30 min with 450 ml of dichloromethane. The insoluble component (3.8 g) was collected and purified by dissolving in 250 ml of tetrahydrofuran, concentrating the resulting solution to 100 ml and diluting with 100 ml of ether. The resulting crystalline product, mp 175°–180° dec. weighed 3.2 g Anal Calcd for $C_{21}H_{23}NO_2$: C, 78.47; H, 7.21; N, 4.36. Found: C, 78.15; H, 7.33; N, 4.20. $\nu^{Nujol}$ 3450, 1718, 1650, 1604 cm$^{-1}$.

EXAMPLE 3

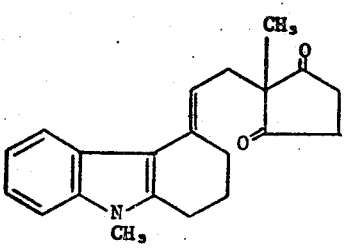

2-Methyl-2[2-(1,2,3,4-tetrahydro-9-methylcarbazol-4-ylidene)-ethyl]-1,3-cyclopentanedione.

The dichloromethane filtrate from the previously described experiment was concentrated to a small volume and diluted with ether to cause precipitation of 45 g of product, mp 165°–170° dec (material turned green at 95° and shrank at about 155° before melting). This material was sufficiently pure for use as an intermediate for subsequent reactions. An analytical sample was obtained by redissolving a portion in dichloromethane and diluting with ether; it had mp 175°–178° dec (turned green at 95° and shrank at 158°).

Anal. Calcd for $C_{21}H_{23}NO_2$: C, 78.47; H, 7.21; N, 4.36. Found: C, 78.32; H, 7.15; N, 4.52.

$\nu^{Nujol}$ 1758, 1715, 1637, 1605 cm$^{-1}$. It is readily distinguished from the product of the previous example by its faster mobility on thin layer chromatography using aluminum oxide plates with 2-butanone-heptane (3:1) as the eluant.

Evaporation of the original xylene-ether filtrate (see previous example) and recrystallization of the residue from dichloromethane-ether gave 7.6 g of additional product, mp 168°–172° dec (turned green at 97°).

EXAMPLE 4

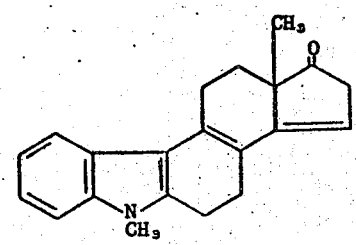

4,5,6,11,12,12a-Hexahydro-6,12a-dimethylindeno-[4,5-c]-carbazol-1(2H)-one
Method A A mixture of 48.0 g (0.15 mol) of 2-[2-(1,2,3,4-tetrahydro-9-methylcarbazol-4-ylidene)-ethyl]-2-methyl-cyclopentane-1,3-dione, 2.4 g of p-toluenesulfonic acid and 1500 ml of benzene was refluxed under a nitrogen atmosphere for 10 min during which time the theoretical yield of water was collected in a Dean Stark water separator. The reaction mixture was cooled and the dark green solution was decanted from a tarry residue. This solution was diluted with dichloromethane, washed successively with sodium carbonate, water, and saturated sodium chloride solution, dried over sodium sulfate, and evaporated to dryness. The resulting yellow solid was recrystallized from dichloromethane-acetonitrile to give 30 g of product, mp 195°–197° dec.

Anal. Calcd for $C_{21}H_{21}NO$: C, 83.13; H, 6.98; N, 4.62. Found: C, 82.91; H, 6.96; N, 4.58. $\nu^{Nujol}$ 1738, 1604, 1535. $\lambda^{CHCl_3}_{max}$ 248 ($\epsilon$21,000), 284 ($\epsilon$12,500), 330($\epsilon$12,800)m$\mu$.

Concentration of the mother liquor and dilution with ether gave 7.0 g of a less pure second crop, mp 183°–190° dec.

Method B

To a mixture of 1.07 g (0.0033 mol) of 3,3a,4,5,6,11,12,12a-octahydro-6,12a-dimethyl-3-hydroxyindeno[4,5c]-carbazol-1(2H)-one and 60 ml of tetrahydrofuran was added 12 ml of 18% hydrochloric acid. The resulting clear solution was allowed to stand at room temperature for 21 hr, concentrated under reduced pressure to one-third its volume, and slowly poured into ice cold saturated sodium carbonate solution. The mixture was stirred at ice-bath temperature for 30 min and the resulting yellow solid was collected, washed well with water and dried in vacuo over phosphorous pentoxide. This solid (1.04 g, mp 175°–182° dec) was recrystallized several times from acetonitrile to give 463 mg of product, mp 193°–195° dec.

EXAMPLE 5

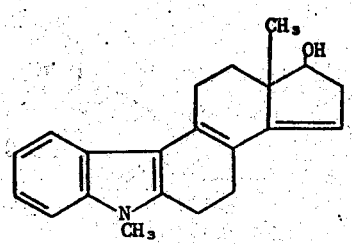

1,2,4,5,6,11,12,12a-Octahydro-6,12a-dimethyl-1hydroxyindeno-[4,5c]-carbazole.

To a suspension of 10.0 g (0.033 mol) of 4,5,6,11,12,12a-hexahydro-6,12a-dimethylindeno-[4,5-c]-carbazol-1(2H)-one in 375 ml of 95% ethanol was added 4.1 g of sodium borohydride followed by 25 ml of water. The mixture was stirred at room temperature for 20 hr, 600 ml of water was added, and it was stirred an additional 3 hr. The resulting precipitate was collected and dried in vacuo over $P_2O_5$ to give 10 g of product, mp 179°–181° dec which was sufficiently pure for use as an intermediate for subsequent reactions. Recrystallization by dissolving in tetrahydrofuran and diluting with ether gave 6.9 g of material, mp 178°–180° dec.

Anal. Calcd for $C_{21}H_{23}NO$: C, 82.59; H, 7.59; N, 4.59. Found: C, 82.45; H, 7.47; N, 4.62. $\nu^{Nujol}$ 3430, 1608, 1540, 1535 cm$^{-1}$. $\lambda_{max}$ 248 ($\epsilon$32,400), 283 (18,200), 296 (14,000), 312 (15,800), 325 (17,000) m$\mu$.

EXAMPLE 6

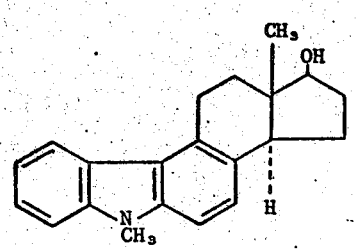

1,2,3,3a,6,11,12,12a-Octahydro-6,12a-dimethyl-1-hydroxyindeno-[4,5c]-carbazole.

A mixture of 10.0 g (0.033 mol) of 1,2,4,5,6,11,12,12a-octahydro-6,12a-dimethyl-1-hydroxyindeno-[4,5c]-carbazole, 5 g of W7 Raney Nickel catalyst and 350 ml of tetrahydrofuran was stirred vigorously at room temperature under a nitrogen atmosphere for 6 hr. and then allowed to stand over night. The catalyst was filtered off, the solvent was evaporated, and the solid residue was triturated with ether to give 8.7 g of crystalline product, mp 217°–221° dec. Recrystallization from dichloromethane-methanol to give 5.9 g of material, mp 220°–221° dec.

Anal. Calcd for $C_{21}H_{23}NO$: C, 82.59; H, 7.59; N, 4.59. Found: 82.47; H, 7.63; N, 4.34. $\nu^{Nujol}$ 3260, 1582, 1475 cm$^{-1}$. $\lambda_{max}$ 242 ($\epsilon$46,000), 268 (24,000), 293 (17,600), 352 (6,000).

EXAMPLE 7

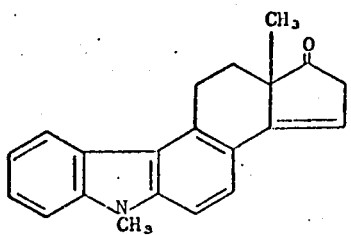

6,11,12,12a-Tetrahydro-6,12-a-dimethylindeno-[4,5-c]-carbazol-1(2H)-one.

A stream of oxygen was passed through a solution of 5.0 g (0.0165 mol) of 4,5,6,11,12,12a-hexahydro-6,12a-dimethylindeno-[4,5-c]-carbazol-1(2H)-one in a mixture of 300 ml of chloroform and 300 ml of 95% ethanol for 48 hr. It was concentrated to a volume of about 200 ml and the resulting precipitate was collected, washed with ether, and dried to give 2.2 g of pink crystalline solid, mp 230°–240°. Recrystallization by dissolving in dichloromethane and dilution with acetonitrile gave 1.6 g of pink crystalline product, mp 243°–246° dec. Another recrystallization gave an analytical sample, mp 244°–246° dec.

Anal. Calcd for $C_{21}H_{19}NO$: C, 83.69; H, 6.35; N, 4.65. Found: C, 83.65; H, 6.47; N, 4.49. $\lambda^{Nujol}$ 1725, 1580, 1475 cm$^{-1}$. $\mu^{CHCl_3}_{max}$ 254 ($\epsilon$34,400), 284 (50,800), 341 (3,800), 358 (3,800) m$\mu$.

We claim:
1. A compound of the formula:

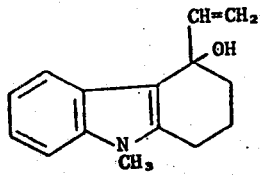

* * * * *